United States Patent [19]
Adams

[11] Patent Number: 5,354,155
[45] Date of Patent: Oct. 11, 1994

[54] DRILL AND REAMER FOR COMPOSITE MATERIAL

[75] Inventor: Larry G. Adams, Arvada, Colo.

[73] Assignee: Storage Technology Corporation, Louisville, Colo.

[21] Appl. No.: 155,782

[22] Filed: Nov. 23, 1993

[51] Int. Cl.$^5$ .............................................. B23B 51/00
[52] U.S. Cl. ................................... 408/145; 451/259; 408/224; 408/228
[58] Field of Search ................. 408/27, 145, 224, 228, 408/144; 51/206 R

[56] References Cited

U.S. PATENT DOCUMENTS

| | | | |
|---|---|---|---|
| 2,732,869 | 1/1956 | Stearns | 408/224 |
| 4,274,769 | 6/1981 | Multakh | 408/145 |
| 4,480,952 | 11/1984 | Jeremias | 408/228 |
| 4,720,218 | 1/1988 | DeFries et al. | 408/145 |
| 5,000,630 | 3/1991 | Riley et al. | 408/228 |

FOREIGN PATENT DOCUMENTS

| | | | |
|---|---|---|---|
| 127804 | 5/1988 | Japan | 408/145 |
| 03563 | 10/1983 | PCT Int'l Appl. | 408/228 |

*Primary Examiner*—Daniel W. Howell
*Attorney, Agent, or Firm*—Sterne, Kessler, Goldstein & Fox

[57] ABSTRACT

A diamond coated drill bit capable of drilling small holes and then reaming the holes to their correct size. The tapered tip of the drill bit has a coarse diamond grit coating which enables it to initiate a hole. The drill bit then gradually grinds the hole to the proper size with a grinder having coarse diamond grit bonded to its surface which is at a predetermined taper. The final diameter of the hole is controlled by using a fine grit diamond reamer above the tapered grinder portion. The grinder applies a radial load to the composite material resulting in no fiber breakout or splintering. The tapered grinder and the reamer are formed on a machined-flat portion of the drill bit which enables coolant to circulate down to the grinding area and allows the easy removal of debris.

13 Claims, 4 Drawing Sheets

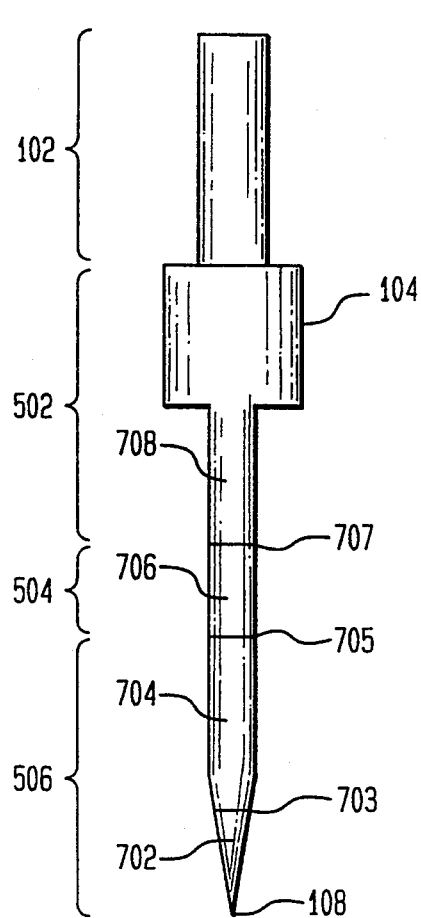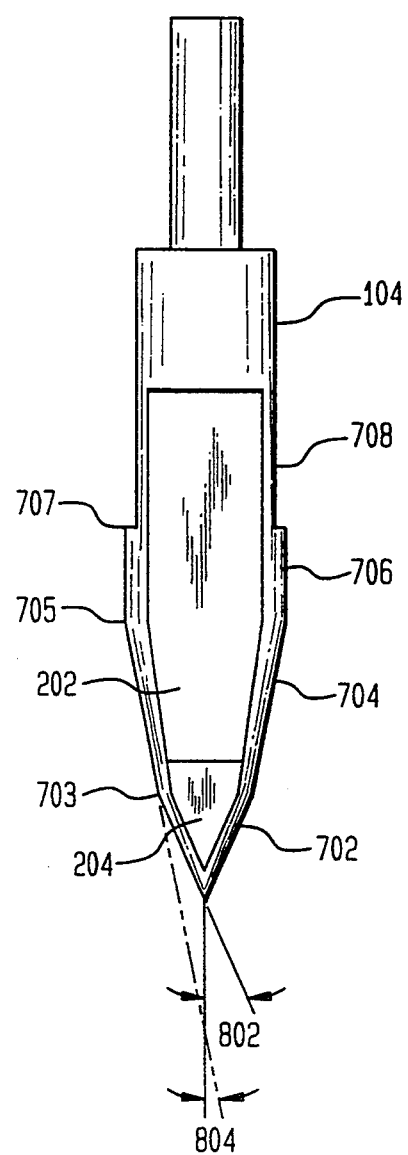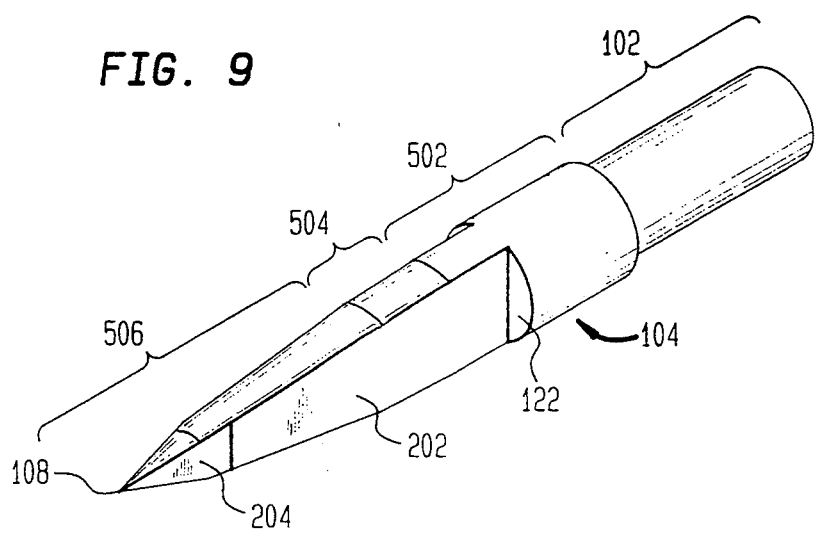

DRILL AND REAMER FOR COMPOSITE MATERIAL

BACKGROUND OF THE INVENTION

1. Field of the Invention

This invention relates generally to bits for drilling and dressing holes and, more particularly, to a diamond grit coated drill and reamer.

2. Related Art

In recent years, the use of fiber reinforced composite materials has been steadily increasing in many industries due to its lightweight and strength. As the use of such materials expands, there will be an increased need for a cost effective method of producing high quality holes in such materials with dimensions which are within narrow tolerances.

A number of problems arise in using known drilling and grinding techniques to produce holes in fiber reinforced composite materials. These problems include delamination and splintering of the material and fiber breakout. Such phenomena are unacceptable in many applications for a number of reasons, including weakening of the structure through which the hole extends. Another reason is that in some applications the rear of the composite material cannot be easily accessed to prevent delamination and splintering or to remove the splintered material. For example, in long length fiber reinforced composite tubes, the inner surface of the tubes cannot be efficiently accessed to prevent fiber breakout or to remove the splintered material.

One conventional solution is to use special drill bits in combination with some kind of backing support. This approach is typically used with drill bits that rely on a sharp cutting edge. This is because these types of drill bits generally delaminate or fray the back side of the composite material as the drill bit is breaking through unless there is some support that keeps the backside surface in compression. Many cutting edge designs have emerged to eliminate the need for this backing support, but none have succeeded. For some structures, such as small diameter tubes, backing supports are not cost effective or easily used.

Another conventional solution is to implement a Computerized Numerical Controlled (CNC) mill in a two step operation. First, an undersized hole is drilled with a drill that does not cause excessive delamination. Second, the CNC mill enlarges the hole using a small diamond coated router. The desired size is achieved using a circle interpolation method. To be cost effective for the production machining of composite tubes, this method would require a large CNC mill to cover the full length of the tube. Even with a large mill, multiple set-ups and a trained machinist are required. Thus, the CNC mill approach is not cost effective for applications such as making repeatable, accurate, and clean holes in fiber reinforced composite tubes.

What is needed is a drill bit that does not require backing support or a CNC mill. The drill bit cannot cause fraying, splintering, fiber breakout, or delamination.

SUMMARY OF THE INVENTION

The present invention is a diamond coated drill and reamer ("drill bit" or "bit") capable of drilling small holes and then reaming the holes to their correct size. The tapered tip of the drill bit has a coarse diamond grit coating which enables it to initiate a hole. The drill bit then gradually grinds the hole to the proper size with a grinder portion having coarse diamond grit bonded to its surface which is set at a predetermined taper. The final diameter of the hole is controlled by a fine grit diamond reamer portion located above the tapered grinder portion.

The drill bit of the present invention is formed from two separate physical entities: a drill blank and a diamond grit coating. The drill bit has a number of integral sections which extend along its axial length from the mounting shaft to the tip. Lastly, the drill bit has a number of functional portions, each of which contributes to formation of a hole without causing delamination, splintering, or fiber breakout.

A coarse grit tapered tip of initiates a hole in the composite material. The tapered grinder portion then gradually grinds the hole to the proper size. The final diameter of the hole is then controlled by a fine grit diamond coated reamer located above the tapered grinder portion. No fiber breakout or splintering occurs throughout the process because the fiber reinforced composite material experiences a loading which extends radially from the drill bit rather than axially. Venting flats on the tapered grinder and reamer portions allow air or coolant to circulate the drill area and to prevent composite debris from clogging the hole.

Further features and advantages of the present invention, as well as the structure and operation of various embodiments of the present invention, are described in detail below with reference to the accompanying drawings.

BRIEF DESCRIPTION OF THE FIGURES

In the drawings, like reference numbers indicate identical or functionally similarly elements. Additionally, the ! eft-most digit of a reference number identifies the drawing in which the reference number first appears. The present invention will be described with reference to the accompanying drawings, wherein:

FIG. 7 shows a side view of drill bit 500;

FIG. 8 shows a front view of drill bit 500 rotated 90° with respect to the side view of FIG. 7; and FIG. 9 shows an isometric view of drill bit 500.

DETAILED DESCRIPTION OF THE PREFERRED EMBODIMENTS

I. Introduction

The present invention is a diamond coated drill bit capable of drilling small holes and then reaming the holes to their correct size. The tapered tip of the drill and reamer has a coarse diamond grit coating which enables it to initiate a hole. The drill bit then gradually grinds the hole to the proper size with a grinder having coarse diamond grit bonded to its surface, which is set at a predetermined taper. The final diameter of the hole is controlled by a fine grit diamond reamer disposed above the tapered grinder portion.

The drill bit will not cause delamination, splintering, or fiber breakout throughout the process because the fiber reinforced composite material experiences a loading which extends radially from the drill bit rather than axially. Venting flats are formed on the tapered grinder and the reamer of the drill bit. The venting flat portion enables air or coolant to circulate the drill area and keeps the area free of debris.

The drill bit of the present invention is discussed below from a number of different perspectives. First, the drill bit of the present invention is comprised of two separate physical entities: an underlying drill blank and a diamond grit coating. Second, the drill bit has a number of sections which extend axially from a mounting shaft to the tip. Lastly, the drill bit has a number of functional portions, each of which contributes to the creation of the hole without causing delamination or fiber breakout. The preferred embodiment of the drill bit of the present invention is described below from each of these perspectives.

II. Drill Blank

A. Structure and Composition

Figure 2:
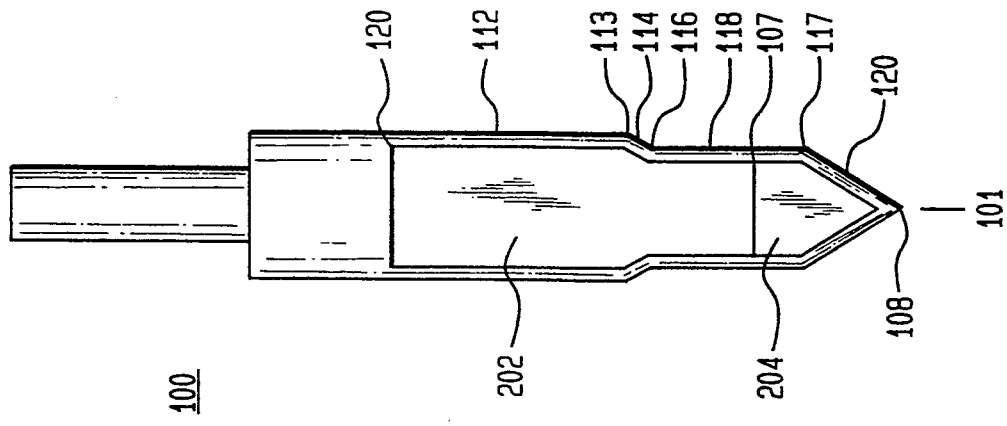
FIG. 2 shows a front view of a drill blank 100 of the present invention rotated 90° with respect to the side view of FIG. 1.
Figure 1:
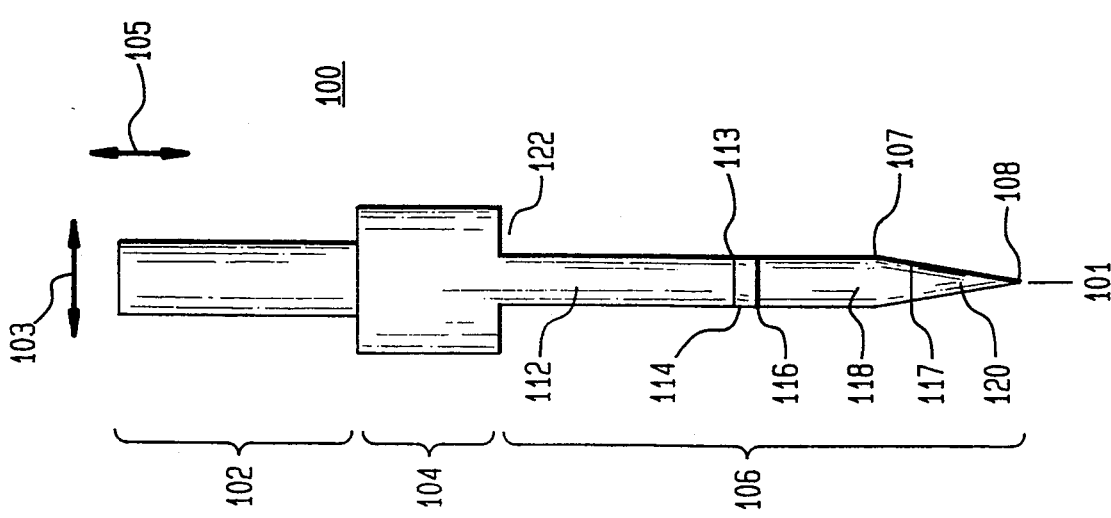
FIG. 1 shows a side view of a preferred embodiment of a drill blank 100 of the present invention.
Figure 3:
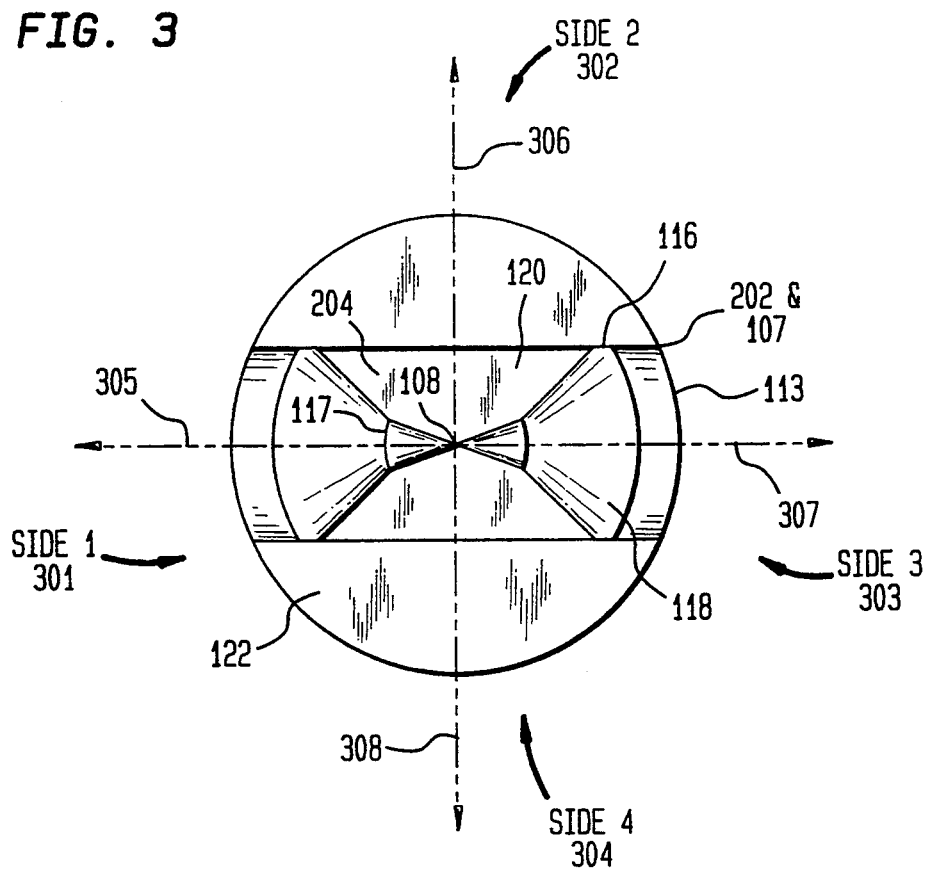
FIG. 3 shows a front end view of the preferred embodiment of the drill blank 100 shown in FIGS. 1 and 2.
Figure 4:
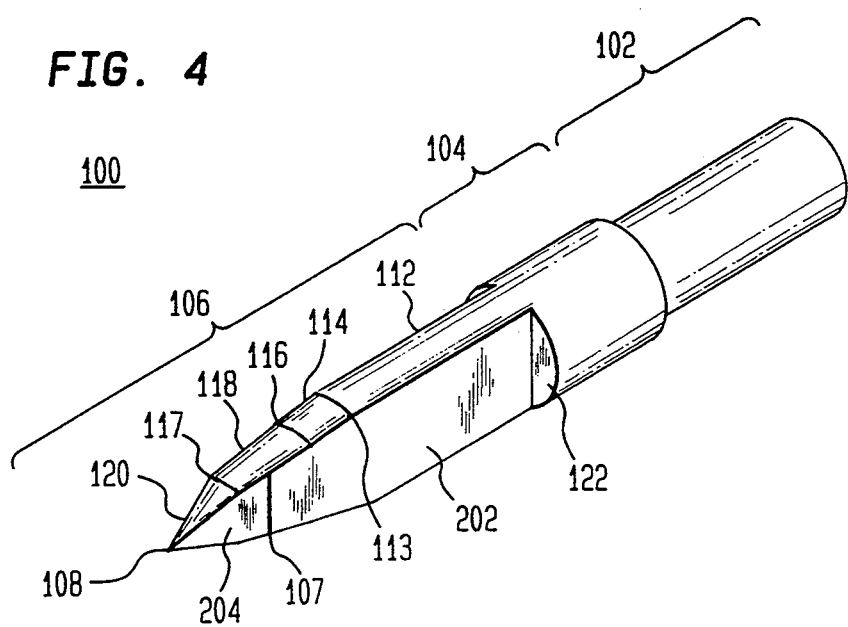
FIG. 4 shows an isometric view of drill blank 100.

As introduced above, the drill bit of the present invention has as one of its main components a drill blank upon which the diamond grit coating is bonded. FIG. 1 illustrates a side view of drill blank 100 of the present invention. FIG. 2 illustrates a front view of drill blank 100 which is rotated 90° with respect to the side view of FIG. 1. FIG. 3 shows a front end view of drill blank 100. FIG. 4 shows an isometric view of drill blank 100.

Drill blank 100 has a quasi-rectangular cross-section, including two substantially flat sides and two cylindrical sides (i.e., the quasi-rectangular shape is formed by cutting two parallel sides into cylindrical drill blank 100). Referring to FIG. 3, first side 301 is opposite third side 303 and second side 302 is opposite fourth side 304. Referring to FIGS. 1 and 2, drill blank 100 is symmetrical along longitudinal axis 101. Therefore, the following description, which is directed towards first side 301 and second side 302, also applies to third side 303 and fourth side 304, respectively. The longitudinal axis 101 of drill blank 100 extends along the length of drill blank 100 in the axial direction 105. The axial direction 105 is orthogonal to the radial direction 103.

The drill bit of the present invention has three main sections. They are: (1) shank section 102, (2) cylindrical section 104, and (3) venting section 106. Each of these sections are integrally formed from a single material such as steel. However, in the drill bit of the present invention, diamond grit coating is utilized to perform all drilling, grinding, and reaming functions. As will become evident from the description which follows, this eliminates the typical requirement that the base material of drill blank 100 be a specific material such as steel or carbide. In addition, drill blank 100 does not have to be heat treated or ground in any particular manner.

In the preferred embodiment of the present invention, shank section 102, cylindrical section 104, and venting section 106, are coaxial and are integrally formed from a single material to form drill blank 100. However, as will be apparent to one skilled in the relevant art, the different sections of drill blank 100 may be separately manufactured and secured to each other in any known manner. Each of the sections of drill blank 100 is machined to achieve a desired configuration and profile.

B. Venting Section

As mentioned above, certain sections of drill blank 100 have a quasi-rectangular cross-section. In particular, referring to FIG. 3, venting section 106 is substantially flat on the second and fourth sides 302,304 and substantially cylindrical on first and third sides 301,303. Again, as noted above, the following description is directed towards first side 301 and second side 302 with the understanding that the description also applies to the third and fourth sides 303,304, respectively.

The first side 301 of venting section 106 has a number of sub-sections, the surfaces of which are tapered at different angles. Likewise, second side 302 has sub-sections which are also tapered at different angles relative to each other and to the sub-sections of first side 301. These different tapers do not necessarily occur at the same point along the axial length 105 of drill blank 100. The venting section 106 is described below with reference to these sub-sections. As used in this specification, "taper" refers to the slope of a surface relative to longitudinal axis 101.

1. Sides 1 and 3

First side 301 of drill blank 100 is divided into a number of contiguous surfaces, each having a different taper. The tip 108 of drill blank 100 is the furthest point in the axially outward direction of drill blank 100. Tip 108 is formed by lower sub-section 112 of venting section 106. Lower sub-section 112 extends axially inwardly and radially outwardly from tip 108. The radial directions in which lower sub-section 112 extends are directions 305,307.

The radially forward point of a gradual taper sub-section 118 is axially and radially adjacent to an inner point of lower sub-section 120. These two points actually are a single point or region and are shown as line 117 in FIG. 1. Thus, the forward point of gradual taper sub-section 118 has a diameter in directions 305,307 that is the equivalent to the maximum diameter of lower sub-section 120 in directions 305,307. As used herein, the term "diameter" refers to the diameter of a circle circumscribing the quasi-rectangular cross-section of drill blank 100. For the first and third sides 301,303, the diameter is the distance from the longitudinal axis 101 to the cylindrical surface in the direction 305,307.

The radially rearward point of gradual taper sub-section 118 has a diameter which is less than the minimum diameter of transition sub-section 114. A step 116 joins these two points. The taper of transition sub-section 114 is substantially equal to that of sub-section 118. The function of transition sub-section 114 and step 116 will be discussed below with reference to the diamond grit coating.

The cylindrical outer surface of rear sub-section 112 is an axially inward continuation of the cylindrical outer surface of transition sub-section 114. The radially forward point of rear sub-section 112 is axially and radially adjacent to the inner point of transition surface 114. These two points are actually a single point or region and are shown as line 113 in FIG. 1. The cylindrical surface of rear sub-section 112 is substantially parallel with the longitudinal axis 101. Therefore, rear sub-section 112 has along its axial length 105 a cylindrical surface with a diameter in directions 305,307 equal to the maximum diameter of transition sub-section 114.

The cylindrical surface of rear sub-section 112 is contiguous with the cylindrical surface of cylindrical section 104 in the directions 305,307. The cylindrical section 104 is discussed below.

2. Sides 2 and 4

Referring to FIGS. 1-4, the configuration and resulting profile of the second and fourth sides 302,304 are now discussed. Second side 302 of drill blank 100 in the venting section 106 is divided into a number of contiguous surfaces, each having a different taper. However, as compared to first and third sides 301,303, second and fourth sides 302,304 are substantially flat.

The term "diameter" of second and fourth sides 302,304 of venting section 106 refers to the distance from longitudinal axis 101 to the substantially flat surface of second and fourth sides 302,304 of venting section 106.

In the embodiment shown in FIGS. 1-4, the second and fourth sides 302,304 of venting section 106 are divided into two sub-sections. They are lower sub-section 204 and upper sub-section 202. Lower sub-section 204 partially forms tip 108 of drill blank 100. Starting at tip 108, the substantially flat outer surface of lower sub-section 204 extends radially outwardly in the direction 306,308 and axially inwardly from tip 108. The rearward point of lower sub-section 204 is axially and radially adjacent to the forward point of upper sub-section 202. These two points are actually a single point or region and are shown as line 107 in FIG. 2. Thus, the forward point of upper sub-section 202 has a diameter in the directions 306,308 that is equivalent to the maximum diameter of lower sub-section 204 in the same direction. Thus, the substantially flat outer surface of upper sub-section 202 is an axially inward continuation of lower sub-section 204, since it is substantially parallel with longitudinal axis 101.

The upper point of upper sub-section 204 of venting section 106 is integrally joined to cylinder section 104. The transition from cylinder section 104 to upper sub-section 204 is achieved with an instep 122. Instep 122 is substantially perpendicular to the first and second planes which encompass the substantially flat surface of upper sub-section 204 and longitudinal axis 101.

C. Cylindrical Section

As described above, cylindrical section 104 is integrally formed with venting section 106. In cylindrical section 104, all four sides 301,302,303,304 are substantially cylindrical, together forming a cylindrical perimeter. On the first and third sides 301,303, the cylindrical surface of rear sub-section 112 is contiguous with the cylindrical surface of cylinder section 104. On the second and fourth sides 302,304, the instep 122 joins the two sections.

D. Shank Section

The shank 102 of drill blank 100 is formed on the axially inner end of the drill blank 100. Drill shank 102 is configured for mounting the drill bit on a drilling apparatus. Shank 100 may be of any diameter or shape necessary to mate with a desired drilling apparatus.

III. Diamond Grit

As introduced above, the drill bit of the present invention is comprised of two separate physical entities: a drill blank 100 and a diamond grit coating. The diamond grit coating is described below.

Certain surfaces of drill blank 100 have a diamond grit coating bonded to them. In the preferred embodiment of the present invention, only the first and third sides 301,303 of venting section 106 are coated with diamond grit. The second and fourth sides 302,304 do not come into contact with the fiber reinforced composite material which is being drilled. Thus, no diamond grit coating needs to be applied to these two sides of venting section 106.

Figure 5:
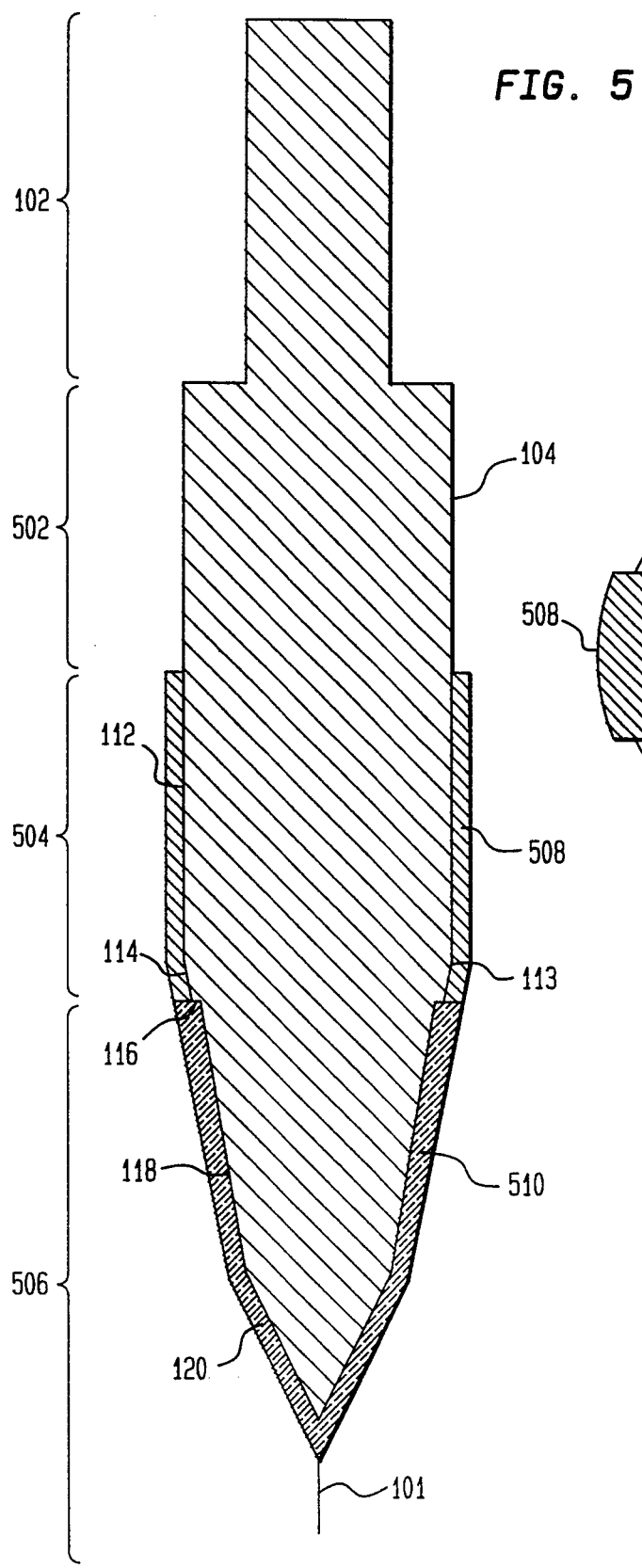
FIG. 5 shows a cross-sectional view of a preferred embodiment of a drill bit 500 of the present invention taken along the longitudinal axis 101.
Figure 6:
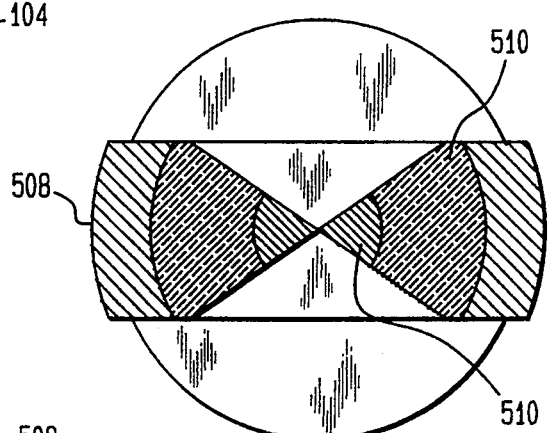
FIG. 6 shows a front end view of the preferred embodiment of drill bit 500.

FIG. 5 is a cross-sectional view of drill bit 500 of the present invention taken along lines 305,307. FIG. 6 shows a front end view of the drill bit 500 wherein the grades of diamond grit are illustrated with various shadings. Referring now to FIGS. 5 and 6, the application of diamond grit to drill blank 100 is described. The grade of diamond coating which is applied to drill blank 100 and the taper of the specific surface to which it is applied determines the function which is performed by the resulting functional portion of drill bit 500. Specifically, drill bit 500 has four functional portions: (1) shank 102, (2) clearance portion 502, (3) reamer portion 504, and (4) grinder portion 506. Each of these are described below.

The outer surfaces of grinder portion 506 and reamer portion 504 are abrasive for drilling, enlarging, and finishing a hole being drilled in a fiber reinforced composite material. The abrasive characteristic of the surfaces is preferably accomplished by plating or bonding diamond grit 508 and 510 onto the first and third sides 301,303 of drill blank 100. In the preferred process of manufacture, diamond grit 508,510 is plated onto the substantially cylindrical surfaces of the grinder portion 506 and reamer portion 504 by a known plating procedure.

In the preferred embodiment of the present invention, there are two grades of diamond grit which are bonded to drill blank 100. They are referred to as course grit diamond coating 510 and fine grit diamond coating 508. The course grit diamond coating 510 is applied to the lower sub-section 120 and gradual taper sub-section 118 of venting section 106. Thus, coarse grit diamond coating 510 extends from tip 108 to point 116 on the tapered cylindrical surface of first and third sides 301,303 of venting section 106. This is grinder portion 506.

The fine grit diamond coating 508 is applied to the transition sub-section 114 and upper sub-section 112 of venting section 106. This combination of fine diamond grit coating 508 and underlying sub-sections of drill blank 100 forms reamer portion 504.

Step 116 and transition sub-section 114 are used to compensate for differences in thicknesses between the course diamond grit coating 510 and the fine diamond coating 508. Utilization of step 116 with transition sub-section 114 results in a stepless change from the coarse grit coating 510 to the fine grit coating 508. The remaining length of upper sub-section 112 and the cylindrical section 104 form the clearance portion 502. Clearance portion 104 is not coated.

The second and fourth sides 202,204 of drill and reamer 500 are as described with reference to drill blank 100. There is no diamond coating applied to sub-sections 202,204 of venting section 106. Likewise, instep 122 of drill blank 100 is not coated with diamond grit.

IV. Drill and Reamer Configuration and Profile

FIG. 7 illustrates a side view of drill bit 500 of the present invention. FIG. 8 illustrates a front view of drill bit 500. FIG. 9 shows an isometric view of drill bit 500.

Referring now to FIGS. 7–9, the configuration and profile of drill bit 500 is described with reference to first side 301 and second side 302. The following description, which is directed towards first side 301 and second side 302, also applies to third and fourth sides 303,304, respectively.

A. Tapered Surfaces of Functional Portions

Since the course and fine diamond coating 508,510 have been applied to the first and third sides 301,303 of drill blank 100, the resulting profile of drill and reamer 500 will have sections which are tapered at different points along the axial length 101 in a manner similar to drill blank 100. However, since different grades of diamond grit are used in the present invention, the sections of drill and reamer 500 are not necessarily aligned with the underlying sections of drill blank 100.

The grinder portion 506 begins at the radially most forward point 108 of drill bit 500. Grinder portion 506 has two sub-sections: a grinder tip sub-section 702 and a grinder body sub-section 704. Grinder tip sub-section 702 extends substantially the same axial length of lower sub-section 120 of drill blank 100. Grinder tip 702 extends radially outwardly and axially inwardly from drill tip 108. Thus, grinder tip 702 increases in diameter in the directions 305,307 in an axially inner direction. Grinder body sub-section 704 has an axially outer end which is axially and radially adjacent to the axially inner end of grinder tip sub-section 702. These two points are actually a single point or region, and are shown as line 703 in FIG. 7. Thus, grinder body sub-section 704 has a minimum diameter that is the same as the maximum diameter of grinder tip sub-section 702.

The grinder body sub-section 704 increases in diameter in directions 305,307 in an axially inner direction and has at its inner end a diameter that is substantially equivalent to the diameter of the reamer portion 504. Grinder body sub-section 704 extends substantially the same axial distance and has substantially the same taper as underlying sub-section 118 of drill blank 100.

The reamer portion 504 has a single sub-section 706. Reamer sub-section 706 extends axially inwardly from the grinder body sub-section 704 of grinder portion 506. The radially forward point of reamer sub-section 706 is axially and radially adjacent to the inner point of grinder body sub-section 704. These two points actually are a single point or region and are shown as line 705 in FIG. 7. Thus, the forward point of reamer portion 504 has a diameter in directions 305,307 that is the equivalent to the maximum diameter of grinder portion 506 in directions 305,307.

The cylindrical outer surface of reamer sub-section 706 is an axially inward continuation of the cylindrical outer surface of grinder body sub-section 704. Therefore, reamer portion 504 has along its axial length a diameter in the directions 303,305 equal to the maximum diameter of grinder portion 506. The reamer sub-section 706 extends in the axially inner direction and has as a inner point 707. Reamer sub-section 706 has at its inner end 707 a diameter that is greater than the diameter of the clearance portion 502 in the directions 303,305. The difference in diameter is equivalent to the thickness of fine diamond grit coating 508. In other words, fine diamond grit coating is not bonded to the first and third sides 303,305 of drill blank 100 past inner point 707 in the axially inward direction.

The clearance portion 502 has a single sub-section 708 of venting section 106. Clearance portion 502 extends axially inwardly from the reamer portion 504. The cylindrical outer surface of clearance portion 502 continues in an axially inward direction and, as discussed above, encompasses cylindrical section 104.

B. Venting Section

The tapered grinder portion 506 and the reamer portion 504 are formed on a venting section 106 of drill blank 100. The substantially fiat second and fourth sides 302,304 of venting section 106 has a diameter which is less than the diameter of cylindrical section 104. This enables the drill bit 500 to circulate coolant to the drill area. In addition, the configuration of venting section 106 prevents the accumulation of debris during the drilling, grinding, and reaming operations. The inventor has found that conventional drill and reamers are unable to grind fiber reinforced composite materials at sufficient speeds without generating excessive heat. Even drill and reamers which have slots in one or more surfaces are often unable to gradually grind the composite material without heat deforming the material without slowing tile process down to a rate which is impractical in manufacturing environments. Thus, in order to replace the conventional drill cutting edges with a complete grinder portion, the inventor determined that a portion of the cylindrical surface area of the grinder and reamer portions would have to be removed to provide coolant access and debris egress.

In the preferred embodiment of the present invention, the diameter of venting section 106 in the directions 306,308 are approximately $\frac{1}{2}$ to $\frac{1}{3}$ the diameter of the clearance portion 502. However, as would be apparent to one skilled in the relevant art, any ratio between the hole diameter which is drilled and the thickness of the venting section 106 may be used.

As shown in FIGS. 5–9, the clearance portion 506 includes a portion of venting section 106. This enables the coolant and debris to continue traveling to and from the drilling area after the reamer portion 504 has penetrated the upper surface of the composite material. Again, this can be any length depending upon the application. Such factors as the axial rate at which the drill bit 500 is advanced, the RPMs, the type of material and the grade of diamond grit coating, contribute to the determination of the thickness and length of venting section 106.

C. Tapers

As introduced above, the transition from grinder portion 506 to reamer portion 504 is a result of step 116 and transition sub-section 114 of drill blank 100. Thus, referring to FIG. 5, there is a single change in taper from the course diamond grit coating 510 of grinder portion 506 to the fine diamond grit coating 508 of reamer portion 504. This is contrasted to the four changes in taper of the underlying drill blank 100 in this region of drill and reamer 500. That is, the taper of gradual taper sub-section 118, step 116, transition sub-section 114, and rear sub-section 112.

Referring to FIG. 8, grinder tip sub-section 702 has a taper 802 relative to the longitudinal axis 101. Grinder body sub-section 704 has a taper 804. Reamer portion 504 is substantially parallel with the longitudinal axis 101 and therefore has a taper of approximately zero degrees.

The taper of grinder portion 506 and reamer portion 504 may have various values. The preferred range of taper 802 of grinder tip sub-section 702 is from 34° to 44°. In the preferred embodiment of the half-inch drill bit 500, the taper 802 of grinder tip sub-section 702 is 39°. The preferred range of taper 804 of grinder body sub-section 704 is from 9° to 19°. In the preferred embodiment of the half-inch drill bit 500, the taper 804 of grinder body sub-section 704 is 14°. The range of values which are provided above have been found by the inventor to include the tapers for other preferred embodiments of the drill bit 500 of the present invention having diameters smaller and greater than 0.5 inches.

The taper of grinder tip sub-section 702, having course diamond grit coating 510, enables the drill and reamer of the present invention to quickly initiate and grind larger holes without causing delamination or fiber breakout of the composite material. The more gradual taper of grinder body sub-section 704 enables the drill and reamer to grind a hole to near net size, again without causing delamination, fiber breakout, or splintering. Following the grinder portion 506 with a reamer portion 504 having the desired diameter of a finished hole, enables drill bit 500 to cleanly finish the hole to the desired size.

D. Diamond Grit

As discussed above, there are two grades of diamond grit coating used in the preferred embodiment of to present invention. They are course diamond grit coating 510 and fine diamond grit coating 508. In the preferred embodiment, course diamond grit coating is 40 grit diamond and fine diamond grit coating is 100 grit diamond. However, as would be apparent to one skilled in the relevant art, any grit diamond coating may be bonded to grinder portion 506 and reamer portion 504, depending upon the application.

V. Alternative Embodiments

In the embodiment illustrated in FIGS. 1–9, drill bit 500 has a diameter of 0.5 inches. This results in the need for the grinder portion 506 to have grinder tip 702, which includes the underlying drill blank sub-section 120 and course diamond grit coating 510. As shown in FIG. 8, grinder tip 702 has a greater taper than that of grinder body 704. This is to limit the length of drill bit 500. The inventor has found that grinder tip sub-section 120 is unnecessary for drill bits having a diameter which is 3/16 inches or less.

Likewise, the second and fourth sides 302,304 of machined flat section 106 are divided into two sub-sections. They are lower sub-section 204 and upper sub-section 202. Lower sub-section 204 is not required for drill and reamers which have a diameter which is less than 3/16 inches.

While various embodiments of the present invention have been described above, it should be understood that they have been presented by way of example, and not limitation. Thus, the breadth and scope of the present invention should not be limited by any of the above-described exemplary embodiments, which should be defined only in accordance with the following claims and their equivalents.

What is claimed is:

1. A drill bit, having a first end and second end, for creating a hole in a composite material, the drill bit comprising:
    a tip at said first end;
    a shank portion at said second end;
    a grinder adjacent to said tip, for initiating the hole, said grinder portion having a substantially rectangular cross-section with substantially cylindrical surfaces on one pair of opposite sides, said substantially cylindrical surfaces of said grinder portion axially tapering towards said tip, said grinder portion having a grinding means on said substantially cylindrical surfaces; and
    a reamer portion disposed between said grinder portion and said shank portion, for finishing said initiated hole, said reamer portion having a substantially rectangular cross section with substantially cylindrical surfaces of substantially constant diameter on one pair of opposite sides, said reamer portion having a reaming means on said substantially cylindrical surface.

2. The drill bit of claim 1,
    wherein said grinding means further comprises an abrasive coating bonded to said substantially cylindrical surfaces of said grinder portion; and
    wherein said reaming means further comprises an abrasive coating bonded to said substantially cylindrical surfaces of said reamer portion.

3. The drill bit of claim 1, wherein said reamer portion has substantially flat surfaces on a second pair of opposite sides of said rectangular cross section of said reamer portion, the distance between said substantially flat surfaces being less than a diameter of said substantially cylindrical surfaces of said reamer portion; and
    wherein said grinder portion has substantially flat surfaces on a second pair of opposite sides of said rectangular cross section of said grinder portion.

4. The drill bit of claim 2, wherein said abrasive coating bonded to said substantially cylindrical surfaces of said grinder portion is course grit diamond.

5. The drill bit of claim 2, wherein said abrasive coating bonded to said substantially cylindrical surfaces of said reamer portion is fine grit diamond.

6. The drill bit of claim 4, wherein said course grit diamond coating is 40 grit grade.

7. The drill bit of claim 5, wherein said fine grit diamond coating is 100 grit grade.

8. The drill bit of claim 3, further comprising a clearance area disposed between said shank portion and said reamer portion, having a substantially cylindrical cross-section with a diameter which is less than said substantially constant diameter of said substantially cylindrical surfaces on said first pair of opposite sides of said reamer portion.

9. The drill bit of claim 3, wherein said grinder portion comprises:
    a grinder tip sub-section integral with said tip at said first end, said grinder tip sub-section comprising said one pair of opposite sides having said substantially cylindrical surfaces and a second pair of opposing sides adjacent to said one pair of opposite sides, said second pair of opposite sides having a substantially planar surfaces tapered towards said tip, wherein said substantially cylindrical surfaces and said substantially planar surfaces enabling said grinder portion to initiate the hole; and
    a grinder body sub-section disposed between said grinder tip sub-section and said reamer portion,
    wherein said axial taper of said grinder portion is greater at said grinder tip sub-section than at said grinder body sub-section.

10. The drill bit of claim 1, wherein said shank portion, said cylindrical portion, said grinder portion, and said reamer portion are integrally formed in a drill blank.

11. A drill bit, having a first end and second end, for creating a hole in a composite material, the drill bit comprising:
- a tip at said first end;
- a shank portion at said second end;
- a grinder portion adjacent to said tip, for initiating the hole, said grinder portion having a substantially rectangular cross section with substantially cylindrical surfaces on one pair of opposite sides, said substantially cylindrical surface of said grinder portion axially tapering towards said tip;
- a reamer portion disposed between said grinder portion and said shank portion, for finishing said initiated hole, said reamer portion having a substantially rectangular cross-section with substantially cylindrical surfaces of substantially constant diameter on one pair of opposite sides; and
- a clearance area disposed between said shank portion and said reamer portion, having a substantially cylindrical cross-section with a diameter which is less than said substantially constant diameter of said substantially cylindrical surfaces on said first pair of opposite sides of said reamer portion,
- wherein said reamer portion has substantially flat surfaces on a second pair of opposite sides of said rectangular cross section of said reamer portion, the distance between said substantially flat surfaces being is less than said substantially constant diameter of said cylindrical surfaces of said reamer portion, and
- wherein said grinder portion has substantially flat surfaces on a second pair of opposite sides of said rectangular cross section of said grinder portion.

12. The drill bit of claim 11, further comprising:
- an abrasive coating bonded to said substantially cylindrical surfaces of said grinder portion; and
- an abrasive coating bonded to said substantially cylindrical surfaces of said reamer portion.

13. The drill bit of claim 12, wherein said shank portion, said cylindrical portion, said grinder portion, and said reamer portion are integrally formed.

* * * * *

UNITED STATES PATENT AND TRADEMARK OFFICE
CERTIFICATE OF CORRECTION

PATENT NO. : 5,354,155

DATED : October 11, 1994

INVENTOR(S) : Larry G. Adams

It is certified that error appears in the above-indentified patent and that said Letters Patent is hereby corrected as shown below:

Column 8, in line 9, delete "fiat" and replace therein --flat--;

Column 9, in line 67, insert --portion-- between "grinder" and "adjacent."

Signed and Sealed this

Twentieth Day of December, 1994

Attest:

BRUCE LEHMAN

Attesting Officer

Commissioner of Patents and Trademarks